US00RE45303E

(19) United States
(12) Reissued Patent
Henry et al.

(10) Patent Number: US RE45,303 E
(45) Date of Reissued Patent: Dec. 30, 2014

(54) METHOD AND APPARATUS FOR CONTROLLING THE DEPTH OF AN AGRICULTURAL WORK UNIT MOUNTED TO A FRAME THAT CAN BE RAISED AND LOWERED BY A CYLINDER ASSEMBLY

(71) Applicant: CNH Canada, Ltd., Saskatoon (CA)

(72) Inventors: James W. Henry, Saskatoon (CA); Dean Knobloch, Tucson, AZ (US)

(21) Appl. No.: 13/895,671

(22) Filed: May 16, 2013

Related U.S. Patent Documents

Reissue of:
(64) Patent No.: 8,235,130
Issued: Aug. 7, 2012
Appl. No.: 12/133,632
Filed: Jun. 5, 2008

(51) Int. Cl.
*A01B 63/111* (2006.01)

(52) U.S. Cl.
USPC ..... 172/4; 172/239

(58) Field of Classification Search
USPC ..... 172/1, 2, 4, 4.5, 7, 9, 10, 239; 56/10.2 R, 10.2 A, 10.2 E, 10.2 D, 10.2 F; 91/361, 459, 461, 527–534
See application file for complete search history.

(56) References Cited

U.S. PATENT DOCUMENTS

| | | | | |
|---|---|---|---|---|
| 4,221,266 | A | 9/1980 | Fardal | |
| 4,279,138 | A | 7/1981 | Van Der Lely et al. | |
| 4,506,898 | A | 3/1985 | Herron | |
| 4,600,060 | A | 7/1986 | Winter et al. | |
| 5,160,239 | A * | 11/1992 | Allen et al. | 414/699 |
| 5,300,918 | A | 4/1994 | Becker | |
| 5,339,906 | A | 8/1994 | Fox et al. | |
| 6,076,611 | A | 6/2000 | Rozendaal et al. | |
| 6,085,846 | A | 7/2000 | Buchl et al. | |
| 6,129,155 | A * | 10/2000 | Lombardi | 172/2 |
| 6,269,885 | B1 * | 8/2001 | Barber et al. | 172/7 |
| 6,371,214 | B1 * | 4/2002 | Anwar et al. | 172/1 |
| 6,698,523 | B2 | 3/2004 | Barber | |
| 7,034,527 | B2 | 4/2006 | Low et al. | |
| 7,063,167 | B1 | 6/2006 | Staszak et al. | |
| 7,259,553 | B2 | 8/2007 | Arns, Jr. et al. | |
| 7,307,418 | B2 | 12/2007 | Low et al. | |
| 2005/0173137 | A1 | 8/2005 | Buchl | |
| 2007/0066374 | A1 * | 3/2007 | Archer et al. | 460/119 |

FOREIGN PATENT DOCUMENTS

| | | |
|---|---|---|
| CA | 1043003 | 11/1978 |
| DE | 3743552 | 7/1989 |

* cited by examiner

*Primary Examiner* — Jamie L McGowan
(74) *Attorney, Agent, or Firm* — Rebecca L. Henkel

(57) ABSTRACT

An agricultural implement has a depth control system in which a position sensor directly measures linear translation of a hydraulic cylinder that lifts and lowers the implement frame to set and adjust the depth of the implement frame. The position sensor may be positioned adjacent to or integrally formed with the hydraulic cylinder, and provides a voltage to a controller remote from the implement. The controller automatically adjusts the flow of hydraulic fluid to and from the hydraulic cylinder to maintain the depth of the implement frame at an operator-selected level.

10 Claims, 4 Drawing Sheets

METHOD AND APPARATUS FOR CONTROLLING THE DEPTH OF AN AGRICULTURAL WORK UNIT MOUNTED TO A FRAME THAT CAN BE RAISED AND LOWERED BY A CYLINDER ASSEMBLY

Matter enclosed in heavy brackets [ ] appears in the original patent but forms no part of this reissue specification; matter printed in italics indicates the additions made by reissue.

FIELD OF THE INVENTION

The present invention relates generally to farm and agricultural related machinery and, more particularly, to a method and system for controlling the depth of a work unit mounted to a frame that is raised and lowered by a hydraulic cylinder.

BACKGROUND OF THE INVENTION

An agricultural implement is generally composed of a number of work units, such as seed or fertilizer dispensers, or soil preparation tools, e.g., discs, tillers, cultivators, plows, and the like, that are typically carried by an implement frame that is hitched to and towed by a tractor, combine or similar wheeled device. The implement frame is generally supported above the ground by a pair of frame supporting wheels, which are mounted to wheel mounting spars that are rigidly attached to a rockshaft. The rockshaft may be rotated by a hydraulic cylinder to effectively raise and lower the implement frame and thus the work units.

For many agricultural implements, it is necessary for an operator to manually raise and lower the implement frame and the hydraulic cylinder holds the implement frame at the position set by the operator. More particularly, conventional depth control systems utilize a poppet valve to stop the flow of hydraulic fluid to the hydraulic cylinder to set the depth of the implement frame and thus the work units. Such stop valves have been found to be inconsistent in setting the depth of the implement frame and the valve is set until hydraulic fluid flow is reversed.

More recently, implements have been designed whereby the depth of the implement frame is monitored and hydraulic fluid flow to the hydraulic cylinder is controlled accordingly. U.S. Pat. No. 6,076,611 to Rozendaal et al. discloses an implement mounted depth control system whereby an electronic position sensor is mounted to the implement frame and senses the rotational position of the rockshaft. The rotational position of the rockshaft is used by a monitor to derive a depth of the work units and control the hydraulic cylinder to raise or lower the implement frame to raise or lower the work units to an operator-selected depth. The depth control system further allows an operator to raise and lower the implement frame using controls within the operator cab.

SUMMARY OF THE INVENTION

The present invention is directed to an agricultural implement towed by a tractor or other vehicle and having a depth control system in which a position sensor directly measures linear translation of a hydraulic cylinder that lifts and lowers the implement frame to set and adjust the depth of the implement frame. The position sensor may be positioned adjacent or integrally formed with the hydraulic cylinder, and provides a signal to a controller remote from the implement. In one implementation, the controller automatically adjusts the flow of hydraulic fluid to and from the hydraulic cylinder to maintain the depth of the implement frame at an operator-selected level.

Thus, in one embodiment, an operator raises or lowers the implement frame to a desired depth. The operator may then depress or otherwise activate a set depth selector that causes the controller to read the output of the position sensor. The output of the position sensor has a voltage level that establishes a baseline voltage to which subsequent voltage readings of the position sensor are compared. More particularly, as the implement is towed along the field, voltage signals are output by the position sensor and those readings are compared by the controller to the baseline voltage. The controller then controls the flow of hydraulic fluid to and from the cylinder so that the cylinder raises or lowers the implement frame. As the frame is raised or lowered, new readings are provided by the position sensor and used by the controller to control hydraulic pressure to minimize the difference between the real-time readings of the position sensor and the baseline voltage. The present invention also allows the operator to manually adjust the depth of the implement frame remotely from within the operator cab.

Therefore, in accordance with one aspect of the invention, an agricultural machine includes a frame configured to carry a plurality of farming related work units. A cylinder is coupled to the frame and configured to raise and lower the frame to adjust the depth of the work units. A sensor is associated with the cylinder and measures the linear displacement of the cylinder. The output of the sensor is a value indicative of the linear displacement and thus is indicative of the depth of the frame.

In accordance with another aspect of the invention, a method of controlling the depth of an agricultural work unit is provided. The method includes providing a set-point value based on an initial position of the work unit and measuring a linear translation of a hydraulic cylinder coupled to the work unit. The method further includes providing a measured value based on the linear translation of the hydraulic cylinder and comparing the measured value to the set-point value. The method also includes controlling hydraulic fluid flow to and from the hydraulic cylinder based on the comparison to reduce a difference between the measured value and the set-point value.

According to a further aspect of the invention, a farming machine includes a frame and a plurality of work units coupled to the frame. A hydraulic cylinder is coupled to the frame and operative to raise and lower the frame. A sensor is proximate the cylinder and measures the linear displacement of the cylinder. A control receives the output of the sensor and automatically controls pressure in the hydraulic cylinder based on the output of the sensor.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

In the drawings.

DETAILED DESCRIPTION OF THE PREFERRED EMBODIMENTS

The present invention is directed to an agricultural implement having a frame that carries a number of farming related tools, such as discs, tillers, sweeps, or dispensers, whose depth is controlled by a depth control system. As will be described, the depth control system includes a sensor, such as a linear potentiometer, that outputs a signal having characteristics that are a function of the linear displacement of a hydraulic cylinder that raises and lowers the implement frame. As known in the art, the hydraulic cylinder includes an extendable piston or ram that when extended lifts the implement frame and when retracted lowers the implement frame. In one embodiment, the sensor includes an integrated linear position sensor, such as those described in U.S. Pat. Nos. 7,307,418, 7,259,553, and 7,034,527, the disclosures of which are incorporated herein by reference.

Figure 1:
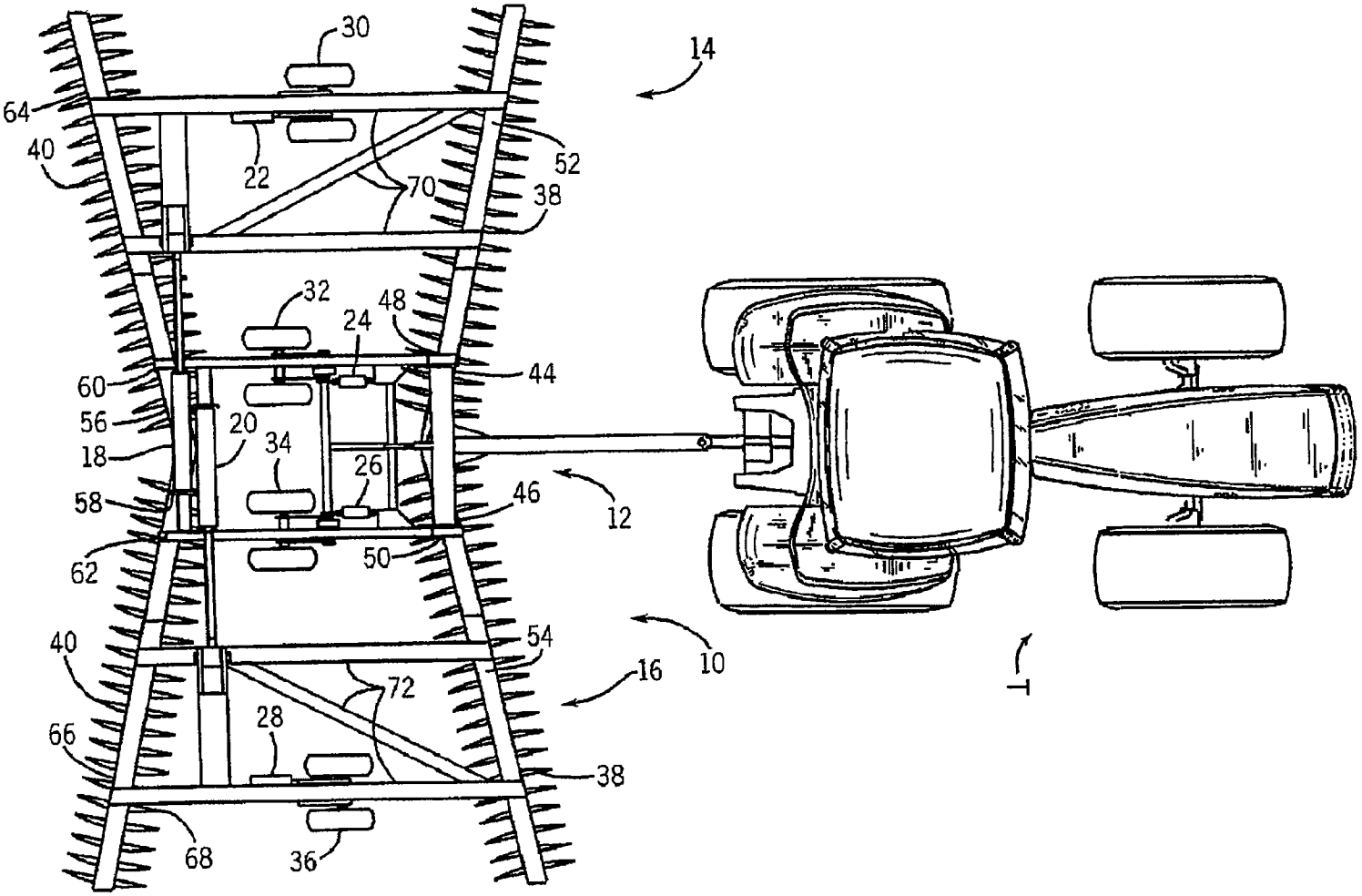
FIG. 1 is a top view of an agricultural machine and an agricultural implement hitched to the agricultural machine and having a depth control system according to one embodiment of the invention.

In FIG. 1, an implement 10 is illustrated having a central frame 12, two wings 14 and 16 pivotally coupled to the central frame, lift actuators 18 and 20 for lifting the wings above the frame, wheel actuators 22, 24, 26, and 28 for raising and lowering wheel sets 30, 32, 34, and 36, front tool gang 38 fixed to the front of the frame and wings, rear tool gang 40 fixed to the rear of the frame and wings. The implement may optionally have a leveling mechanism for leveling the implement, as described in U.S. Pat. No. 7,063,167.

Front tool gang 38 includes inner forward gang tubes 44 and 46 which are bolted to central frame 12 and extend laterally away from the central frame. These gang tubes have pivotal couplings 48 and 50 disposed at their outer ends to which outer forward gang tubes 52, 54, respectively, are pivotally connected.

Rear tool gang 40 includes inner rear gang tubes 56 and 58 which are bolted to central frame 12 and extend laterally away from the central frame. These gang tubes have pivotal couplings 60 and 62 disposed at their outer ends to which outer rearward gang tubes 64 and 66, respectively, are pivotally connected.

A plurality of ground engaging tools, here shown as discs 68, are fixed to and disposed below each of the gang tubes. Like each pair of inner and outer gang tubes themselves, these discs are arranged in a substantially straight line.

The gang tubes on each side of the implement are bolted to a wing frame on that side of the implement. Outer gang tubes 52 and 64 are coupled to wing frame 70, and outer gang tubes 54 and 66 are coupled to wing frame 72.

The outer gang tubes are pivotally coupled to the inner gang tubes to permit them to be lifted above and over the central frame to permit the implement to be folded up for clearance when towed over the road. This lifting is provided by lift actuators 18 and 20, here shown as hydraulic cylinders. Lift actuator 18 is coupled between central frame 12 and wing frame 70 to lift wing 14, and lift actuator 20 is coupled between central frame 14 and wing frame 72 to lift wing 16. When lift actuators 18 and 20 are retracted, they pull their associated wings 14 and 16 upward and over the top of central frame 12 about pivotal couplings 48, 60, and 50, 62, respectively.

Wing 14 includes wing frame 70, front and rear gang tubes 52 and 64, respectively, and the ground engaging tools attached to those tubes. Wing 16 includes wing frame 72, front and rear gang tubes 54 and 66, and the ground engaging tools attached to those tubes.

Figure 2:
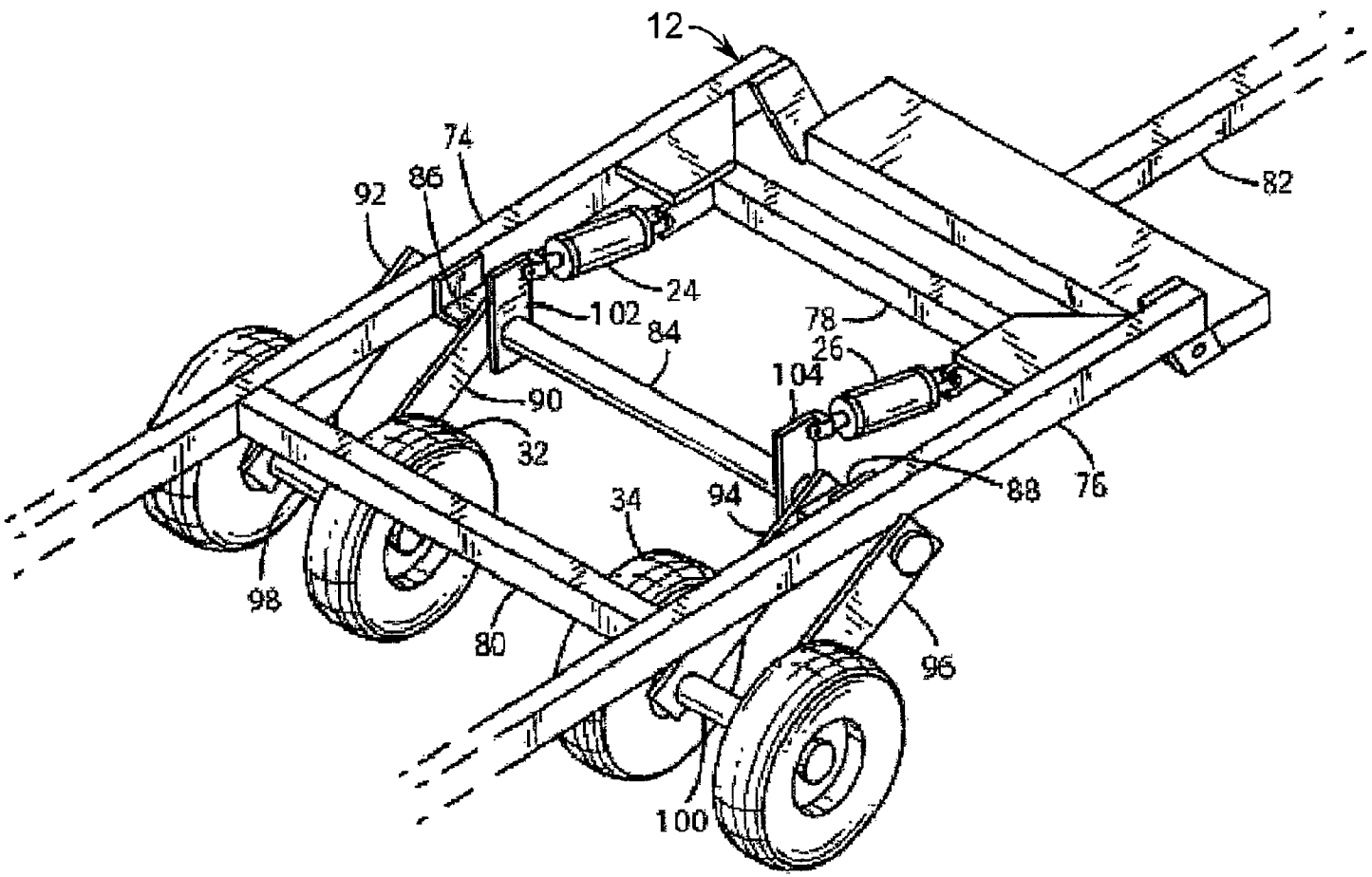
FIG. 2 is a partial isometric view of the agricultural implement of FIG. 1.

Referring to FIG. 2, central frame 12 includes two fore-and-aft extending members 74 and 76 to which wheel sets 32 and 34, respectively, are pivotally mounted. Side-to-side members 78 and 80 are disposed at the front and rear, respectively, of the frame and are coupled to members 74 and 76 to form a substantially rectangular framework. A tongue 82 is coupled to central frame 12 and allows the implement to be hitched to a tractor in a known manner.

A rockshaft 84 extends laterally across central frame 12 and is supported in rotation at each end by bearings 86 and 88 that are mounted on fore-and-aft members 74 and 76, respectively. Bearings 86 and 88 constrain rockshaft 84 to rotate about its longitudinal axis with respect to central frame 12. Four wheel supports 90, 92, 94 and 96 extend downward and rearwardly from rockshaft 84 to which they are attached. Wheel supports 90 and 92 are disposed on the inside and the outside, respectively, of bearing 86 and member 74 to which bearing 86 is attached. Wheel supports 94 and 96 are disposed on the inside and outside, respectively, of bearing 88 and fore-and-aft member 76 to which bearing 86 is attached. Thus, when rockshaft 84 rotates, it causes the outer ends of wheel supports 90, 92, 94 and 96 to simultaneously and equally raise or lower with respect to central frame 12. Two axles 98 and 100 are provided to which wheel sets 32 and 34 are mounted for rotation. Axle 98 is mounted to the outer ends of wheel supports 90 and 92, and axle 100 is mounted to the outer ends of wheel supports 94 and 96. Wheel set 32 has two wheels that are mounted to opposing ends of axle 98, and wheel set 34 has two wheels that are mounted to opposing ends of axle 100. The wheels in each wheel set are disposed on opposite sides of their associated fore-and-aft member, one inside and one outside. Wheel actuators 24 and 26 are pivotally coupled to fore-and-aft members 74 and 76, at one end, and at the other end to brackets 102 and 104. Brackets 102 and 104 are mounted to rockshaft 84 to rotate with rockshaft 84.

When wheel actuators 24 and 26 are retracted, the wheels are raised thereby causing a lowering of the implement and the work units coupled thereto. When actuators 24 and 26 are extended, they push the upper ends of brackets 102 and 104 away from the actuators toward the rear of the implement. The lower ends of brackets 102 and 104 are coupled to rockshaft 84, which causes rockshaft 84 to rotate clockwise. This clockwise rotation causes wheel supports 90, 92, 94 and 96 to also rotate clockwise. As the wheel supports rotate clockwise, the outer ends of the wheels supports and the two wheels sets coupled to the wheel supports also lower. As a result, the wheels pivot about rockshaft 84 as they are lowered thereby lifting the implement.

In one embodiment, the actuators 24 and 26 are hydraulic cylinders, with one of the cylinders including an integrated linear position sensor, such as those described in U.S. Pat. Nos. 7,307,418, 7,259,553, and 7,034,527, the disclosures of which are incorporated herein by reference. It is contemplated however that both cylinders may include a position sensor.

Figure 3:
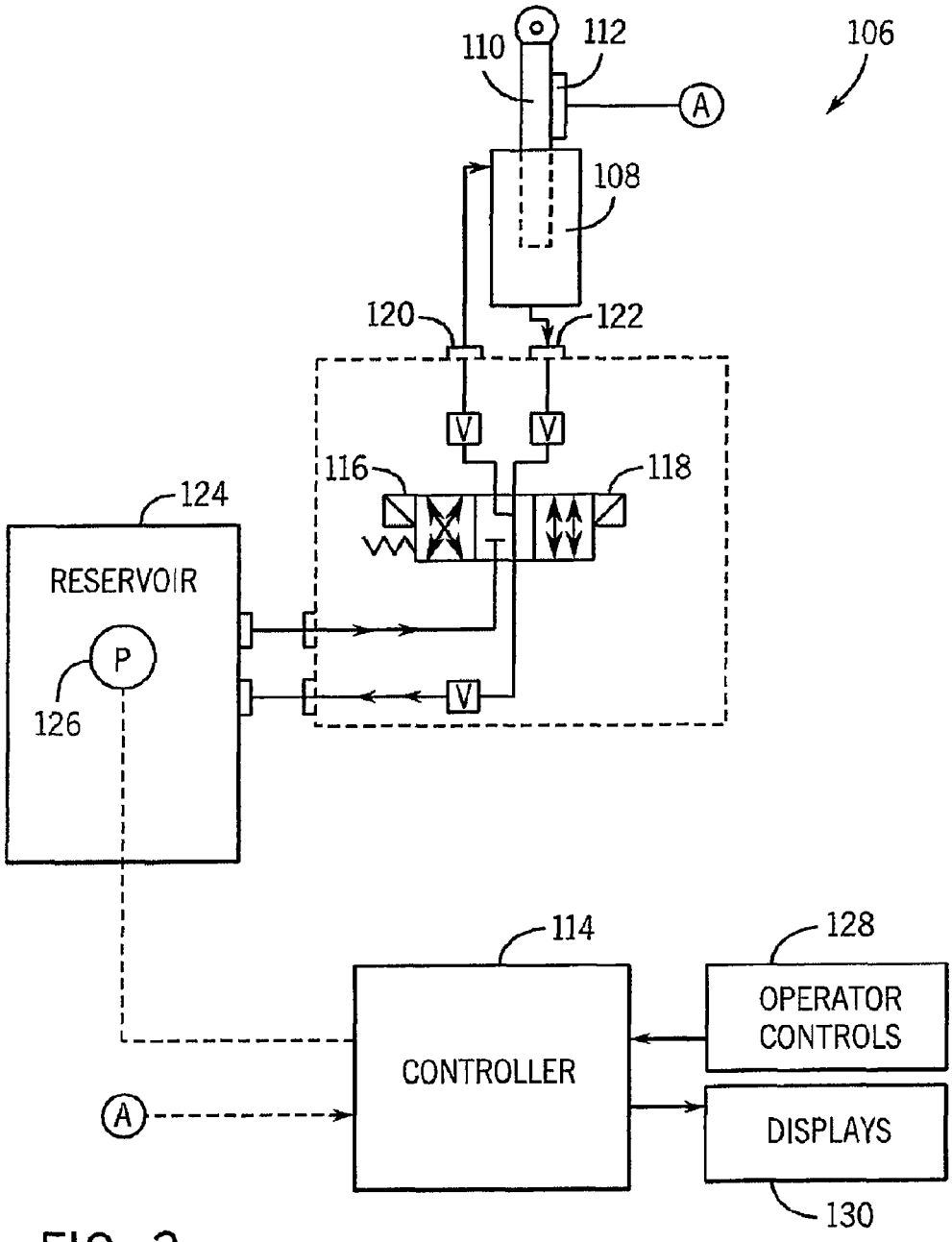
FIG. 3 is a schematic diagram of a depth control system according to the present invention.

The depth control system 106 is schematically illustrated in FIG. 3 and controls the flow of hydraulic fluid to and from depth control hydraulic cylinder 108. Piston 110 is extendable and retractable from cylinder 108 and has an integrated linear potentiometer that provides a signal to a controller 114 of the tractor T. As will be described, the controller 114 selectively energizes a raise solenoid 116 and a lower solenoid 118. Hydraulic fluid is supplied to the cylinder 108 through supply port 120 and is returned through a return port 122. The solenoids 116 and 118 are fluidly connected to a fluid reservoir 124 that includes a pump 126.

When raise solenoid 116 is energized, hydraulic fluid is supplied to the cylinder 108 along a fluid path between reservoir 124 and cylinder 108, thereby causing an extension of piston 110 that is coupled to bracket 102, FIG. 2. As the piston is extended, the bracket 102 rotates rearwardly or in a counterclockwise direction thereby causing the implement to lift. Conversely, when solenoid 118 is energized, a fluid path is open between the cylinder 108 and the reservoir 124 resulting in fluid being drawing from the cylinder 108. This causes a retraction of the piston 110 and thus a lowering of the implement.

The controller 114 selectively energizes the solenoids 116, 118 to maintain the depth of the implement at an operator selected level, which is selected using appropriate operator controls 128 within the operator cab of the tractor. The operator cab may also include various displays 130 to provide feedback regarding operation of the depth control system and other systems of the implement or tractor.

Figure 4:
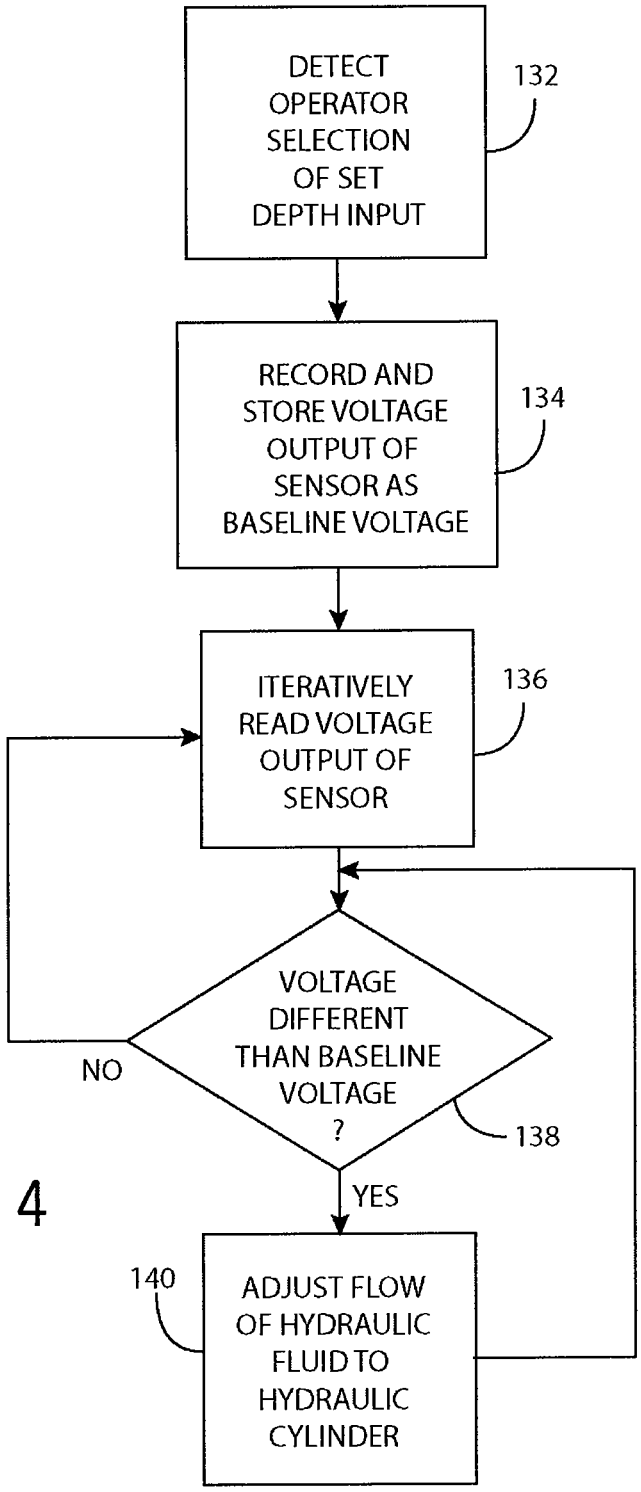
FIG. 4 is a flow chart setting forth the steps of a method of setting the depth of the agricultural implement of FIG. 1.

The feedback provided by the integrated potentiometer 112 is used by the controller 114 to derive a relative depth of the implement 10. More particularly, and referring now to FIG. 4, the operator manually sets the implement to a desired depth. The depth can be set remotely using controls within the operator cab of the tractor if so equipped or at the implement itself. Once the depth has been selected, the operator activates a set-depth control which is detected by the controller at block 132. Responsive thereto, the controller 114 reads and stores the output of the potentiometer 112 integrally formed with the cylinder 108. The output of the potentiometer provides a baseline voltage that is stored in memory at block 134. As the implement is towed along the field, the controller 114 iteratively reads the output of the potentiometer 112. Any leakage of hydraulic fluid as the implement is being towed, which can cause a change in the depth of the implement, is detected by a change in the voltage output of the potentiometer 112. That is, as the piston 110 is retracted and extended as a result of unintended changes in the flow of hydraulic fluid to and from the cylinder 108, the output of the potentiometer 112 will also change. Those changes are detected by the controller at block 136 and compared to the baseline voltage at block 138. If the position of the piston 110 has changed, which would result in a change in the depth of the implement, the voltage output of the potentiometer 112 will differ from the baseline voltage. Thus, if the voltage is different, the controller selectively energizes one of the solenoids at block 140 to either extend or retract the piston 110 until the output voltage of the potentiometer 112 equals, within some tolerance, the baseline voltage. If the voltage substantially equals the baseline voltage, the controller 114 returns to block 136 with continued monitoring of the potentiometer.

In the above described embodiment, one of the wheel actuators includes a cylinder with an integrated potentiometer. Thus, changes in depth readings are measured at that cylinder and any changes in hydraulic flow to maintain the depth of the implement at the operator selected level are made in that and the other wheel actuators. It is also contemplated however that each wheel actuator may have a cylinder with an integrated potentiometer and that the hydraulic pressure in the cylinders can be independently controlled to independently vary the position of the wheel actuators.

In a preferred embodiment, the position sensor is integrally formed with the hydraulic cylinder and its piston, but it is understood that other types of sensors could be used to directly measure the position of the piston and cylinder relative to one another. Moreover, sensors that measure voltage changes as a function of the displacement of a cylinder is representative and as such sensors that measure other types of parameters, such as sound, current, force, and the like, may be used and are considered within the scope of the invention.

Additionally, it is recognized that the output of the sensor could be provided to the controller in a wired or wireless transmission.

Many changes and will modifications could be made to the invention without departing from the spirit thereof. The scope of these changes will become apparent from the appended claims.

We claim:

1. An agricultural machine, comprising:

a central frame configured to carry a plurality of farming related work units;

left and right wheel sets pivotally mounted to the central frame;

a left wheel actuator interconnecting the left wheel set and the central frame and being configured to raise and lower the *central* frame to adjust a depth of the work units, the left wheel actuator including a hydraulic cylinder and a piston extendable and retractable from the hydraulic cylinder;

a right wheel actuator interconnecting the right wheel set and the central frame and being configured to raise and lower the *central* frame to adjust a depth of the work units, the right wheel actuator including a hydraulic cylinder and a piston extendable and retractable from the hydraulic cylinder of the right wheel actuator;

a depth control system controlling [the] *a* flow of hydraulic fluid to and from the hydraulic cylinders of the left and right wheel actuators;

a left position sensor integrally formed with the hydraulic cylinder and the piston of the left wheel actuator, the left position sensor configured to measure a linear displacement of the piston of the left wheel actuator and provide a signal to the depth control system indicative of a depth of a first portion of the *central* frame;

a right position sensor integrally formed with the hydraulic cylinder and the piston of the right wheel actuator, the right position sensor configured to measure a linear displacement of the piston of the right wheel actuator and provide a signal to the depth control system indicative of a depth of a second portion of the *central* frame;

wherein:

at least one of the left and right position sensors is a linear potentiometer instrument that is configured to output a signal having a voltage that changes with linear displacement of the piston of the corresponding hydraulic cylinder;

the depth control system including a controller that receives the signal from the linear potentiometer and can store the voltage of the signal to define a baseline voltage upon selection of a depth of the plurality of farming related work units by an operator, the controller controlling flow of hydraulic fluid to the hydraulic cylinders so as to automatically control pressures in the hydraulic cylinders of the left and right wheel actuators in response to the signals received from the left and right position sensors relative to the baseline voltage to raise and lower the *central* frame such that the depth of the plurality of farming related work units is maintained at the depth of the plurality of farming related work units that was selected by the operator.

2. The agricultural machine of claim 1 wherein the work units are seed or fertilizer dispensers.

3. The agricultural machine of claim 1 wherein the work units are soil preparation devices.

4. The agricultural machine of claim 1 wherein the controller is further configured to control the flow of hydraulic fluid to the cylinders to minimize a difference between an instantaneous values of parameters measured by the sensors and set point values for the parameters.

5. The agricultural machine of claim 1 further comprising a fluid reservoir fluidly connected to the hydraulic cylinders and solenoids communicatively connected to the controller, wherein the controller controls operation of the solenoids to deliver hydraulic fluid to the hydraulic cylinders based on outputs of the linear potentiometers.

6. The agricultural machine of claim 5 wherein the fluid reservoir contains hydraulic oil.

7. The agricultural machine of claim 1 further comprising an operator cab remote from the *central* frame and comprising operator controls that allow an operator to vary the depth of the work units from within the operator cab.

8. A farming machine comprising:

a central frame, wherein said central frame includes first and second fore-and-aft extending members;

a left and right wheel set pivotally mounted on said first and second fore-and-aft extending members; respectively;

a front and back side member connected to said fore-and-aft members;

a left and right bearing mounted on each of said fore-and-aft members;

a rockshaft having opposing ends extending laterally across said central frame, wherein said left and right bearings constrain said rockshaft to rotate about a longitudinal axis with respect to said central frame;

a left bracket mounted on one of the outer ends of said rockshaft;

a right bracket mounted on opposing end of said rockshaft;

a plurality of work units coupled to the *central* frame;

a left hydraulic cylinder coupled to the first fore-and-aft member at one end and at the left bracket;

a right hydraulic cylinder coupled to the second fore-and-aft member at one end and at the said right bracket;

said left and right hydraulic cylinder operative to raise and lower the *central* frame;

a depth control system controlling [the] *a* flow of hydraulic fluid to and from the hydraulic cylinders, the hydraulic cylinders being depth control hydraulic cylinders;

pistons extendable and retractable from the depth control hydraulic cylinders;

sensors that measures linear displacement of the pistons with respect to the depth control hydraulic cylinders, the sensors integrally formed with the depth control hydraulic cylinders and the pistons so that each sensor outputs a signal with a voltage that corresponds to a position of relative extension or retraction of the piston with respect to the respective depth control hydraulic cylinder; and a controller that receives the signals of the sensors, the controller including a memory and a set-depth control that can be activated by an operator when the plurality of work units has achieved a first depth that is set by the operator such that, upon activation of the set-depth control, the controller receives the signals from the sensors and stores the voltages of the signals in the memory so as to define a baseline voltage that is indicative of the position of relative extension or retraction of the piston with respect to the respective depth control hydraulic cylinder that corresponds to the first depth of the plurality of work units, and wherein the controller iteratively receives signals from the sensors and independently controls pressure in the depth control hydraulic cylinders based on the outputs of the sensors to raise and lower the *central* frame so as to attenuate deviation of the voltages from the baseline voltage and maintain the first depth of the plurality of work units.

9. The farming machine of claim 8 wherein the sensors are contained within the hydraulic cylinders.

10. The farming machine of claim 8 wherein the work units are one of seed or fertilizer dispensers and soil preparation tools.

* * * * *